2,868,664

DRY MANNOGALACTAN COMPOSITION

Arthur M. Goldstein, Jackson Heights, N. Y., assignor to Stein, Hall & Co., Inc., New York, N. Y., a corporation of New York No Drawing. Application May 3, 1954
Serial No. 427,365

5 Claims. (Cl. 106—208)

The present invention relates to a composition essentially comprising a mannogalactan gum that is modified to render the gum readily dispersible in water and to permit swelling and opening of the gum when it has been dispersed sufficiently to avoid lumping. The invention also relates to an improvement in the paper making process which comprises adding the mannogalactan gum composition to a paper furnish prior to the formation of the web.

It has been known for some time that mannogalactan gums, such as guar, tara, and locust bean gums, have properties of considerable utility when they are available in the form of an aqueous solution. Thus, for example, the addition of an aqueous solution of a mannogalactan gum to the furnish, i. e., an aqueous suspension of fibrous materials, in a paper making process is advantageous in that it tends to increase the Mullen and wet and dry tensile strengths of finished paper or, in the alternative, allows the paper to be run through the machine more quickly. Guar gum has also found considerable utility in the stabilization of food products such as ice cream and the like. Generally it is important, whether the gum be utilized in relatively delicate operations such as those involved in the manufacture of paper, that the gum be available, in a swollen or opened state, in the form of an aqueous solution that does not contain lumps. The absence of lumps is important because they clog up the screens through which the solution is passed or, if allowed to go into the ultimate product, make the product unsalable as, for example, by the appearance of "fish eyes" in paper.

The problem of forming lump-free aqueous solutions of mannogalactan gums arises from the fact that these hydrophilic gums, in powder form, absorb water so rapidly that unless extreme care is taken to disperse the gum particles in the water as rapidly as the gum is added by vigorous stirring, the exterior gum particles in a group of such particles will form a gelatinous mass surrounding the interior particles and prevent the water from wetting those interior particles. At tap and room temperatures, this is true particularly of guar and tara gums and, to a lesser but still appreciable degree, of locust bean gum. When added to hot water, the dispersion of locust bean gum presents the same difficulties as that of other mannogalactan gums.

The present invention offers a novel approach to the problem of adequately dispersing and then opening or swelling a mannogalactan gum in water and possesses a number of advantages that are entirely unexpected. In essence, the invention is based on the surprising discovery that it is possible to pretreat one or more of the components of a modified mannogalactan gum composition in such a manner that when the composition is added to water, the hydrophilic properties of the gum will at first be inhibited sufficiently to insure substantially complete dispersion of the gum in the water and thereafter be regained to an extent sufficient to promote extensive absorption of water, with consequent swelling or opening of the gum.

The composition of the invention comprises a mannogalactan gum, e. g., guar gum, tara gum, locust bean gum or the like, with preselected proportions of a hydrophobing or gum-dispersing agent and of a neutralizing agent for overcoming the hydrophobing effect of the hydrophobing or gum-dispersing agent, the neutralizing agent and, if desired, a portion of the hydrophobing agent having been pretreated to delay its or their solubilization, and therefore effectiveness, in water.

The hydrophobing or gum-dispersing agent may be any material capable of at least temporarily inhibiting or counteracting the hydrophilic properties of the gum so that the gum will not swell so quickly upon contact with water as to interfere with its dispersion. Materials capable of liberating borate ions when added to water, such as alkali metal borates, particularly sodium tetraborate (borax), sodium perborate and sodium metaborate, have been found particularly useful as hydrophobing or gum-dispersing agents.

The neutralizing agent may be any material that is capable of overcoming or inhibiting the effect of the hydrophobing agent upon the ability of the gum to absorb water and swell. Generally, any acid material which will not act to char or seriously degrade the gum may be used as the neutralizing agent. Water-soluble acid salts such as monosodium phosphate, aluminum sulfate and ammonium chloride are particularly desirable, normally solid organic and inorganic acids such as citric and boric acid, respectively, and acid-reacting aldehydes such as glyoxal and pyruvic aldehyde, however, also being suitable.

The requirements of the hydrophobing and the neutralizing agents for the purposes of the present invention are also dependent in part upon whether they are pretreated to delay their solubilization in water and, if so, the conditions of the pretreatment. Thus, for example, the neutralizing agent to be pretreated must not only be capable of inhibiting the effect of the hydrophobing agent upon the gum when dissolved in water, i. e., by regaining for the gum its hydrophilic properties, but it must also be inert to the material with which it is pretreated and under the conditions of pretreatment. Thus, for example, if the agent is pretreated by coating or dissolving it at elevated temperature with or in a material that is slowly soluble in water, it must not decompose at the elevated temperature or react with the pretreating material and thereby lose its desired function when it is liberated in water, or become so intimately bound to the pretreating material as to not be liberated in water, upon dissolution of the pretreating material.

The material with which neutralizing agent, and, if desired, a portion of the hydrophobing agent is pretreated should be one that is inert to the material with which it is combined, has no deleterious action on either the dispersal or swelling of the gum, and is not tacky at temperatures ordinarily encountered during storage or transport. The material should, preferably, be soluble in water, but not so soluble as to dissolve immediately when added to water in the form of discrete particles sufficiently small to be substantially uniformly dispersed throughout a powdered mixture. The material must also be one capable of physically combining with a given agent at a temperature below the decomposition temperature of that agent.

Among the materials that have been found particularly suitable for this purpose are polyethylene glycols having an average molecular weight above about 2000 and preferably in the range of about 6000 to 7500, the higher molecular weights being preferred because of the slower solubility of polyethylene glycol with higher molecular weight. Gelatin, salol or phenyl salicylate, as well as combinations of salol with such materials as shellac, are also suitable but not preferred because of the incomplete solubility of the latter.

The delay in solubilizing the neutralizing agent or a portion thereof and, if desired, a portion of the hydrophobing agent, is preferably accomplished by combining the agent or agents with the pretreating material in a form of discrete particles of a size sufficiently large to insure slow, as opposed to substantially instant, solubility. The particle size of the pretreated component or components may vary considerably depending upon the amount of delay desired in releasing the particular component and the solubility of the pretreating material. The optimum particle size of pretreated neutralizing agent is one in which the interval of time required for it to dissolve in the water is approximately equal to the time required to effect a complete dispersion of the gum in the water. Where a portion of the hydrophobing agent or other agent to control the final viscosity of the mannogalactan gum solution is pretreated, the particle size and the pretreating agent should be selected to delay the liberation of the pretreated agent or agents until the gum has not only been initially dispersed but also allowed to be swollen or opened.

The time required to adequately disperse the gum in water, and therefore the delay desired in liberating the neutralizing agent, may vary with the grade and identity of the particular gum and with the amount of hydrophobing agent employed. These variations can readily be determined by those skilled in the art. The delay in liberating the neutralizing agent should not be unduly long because it serves no useful purpose to delay the opening of the gum after it has once been adequately dispersed. Such delay would merely add to the time required to bring the gum into its most useful state.

By way of illustration, there is no practical advantage in making the average particle size of monosodium phosphate coated with polyethylene glycol having an average molecular weight of about 6000 larger than about 3.5 mm., i. e., that which fails to pass through a No. 6 sieve. Larger particle size would merely delay liberation of the neutralizing agent longer than ordinarily necessary and promote undesirable settling out of the particles in the mixture. On the other hand, in order to obtain sufficient delay in liberation of the monosodium phosphate, the average particle size of the fused mixture should be at least about 0.17 mm., i. e., too large to pass through a No. 80 sieve, and preferably more than about 0.25 mm., i. e., too large to pass through a No 60 sieve. Average particle sizes between about 0.4 and about 1.0 mm. are considered optimum for fusion mixtures of monsodium phosphate and polyethylene glycol having an average molecular weight of about 6000.

The proportions of hydrophobing agent and neutralizing agent in the mannogalactan gum composition and the relative proportions of these agents to one another may vary considerably depending upon the particular results desired and also to some extent upon the degree to which the gum has been refined. The problem of first dispersing and then opening or swelling the gum cannot be solved by mere adjustment and subsequent regulation of the pH. Thus, for example, it has been found that if no borate ions are present the gum particles will not disperse well when added to water even though the pH of the water is adjusted to 8 or higher. Similarly, it has been found that the gums will swell if the pH of the water is reduced to below 7. The gums will also swell at pH values substantially above 7 provided, however, that the borate ion concentration is reduced to a value below that required to bring about adequate dispersion.

By way of illustration, it has been found that as little as 0.5% or even less borax in the composition, but more than 0.1%, if present in the composition with another alkaline material to bring the pH up to about 8, exerts sufficient hydrophobing effect upon a fairly highly refined guar gum to promote excellent dispersion thereof in water and that the gum will swell and open in cold water upon the liberation of a relatively small amount of neutralizing agent such as monosodium phosphate even though it is effective to reduce the pH only to about 7.5. On the other hand, if the borate is present in the composition to an excessive amount, e. g., about 20%, an amount of monosodium phosphate sufficient to reduce the pH to 7.5 is not sufficient to adequately neutralize the hydrophobing effect of the borate ions and allow the gum to open, an amount sufficient to reduce the pH to below 7 being required.

While, for the reasons pointed out, it is possible to vary considerably the proportions of the components, it is generally desirable to adjust the proportions of hydrophobing agent and neutralizing agent in the composition in such a manner that the initial pH, upon adding the composition to water, is at least about 8 and the pH, after liberation of the neutralizing agent, is about 7.5 or less. These considerations are generally satisfied by incorporating in the composition at least about 0.5% by weight of the gum of a borate, or an equivalent amount of other hydrophobing agent, and at least about 0.5% by weight of the gum of monosodium phosphate, or an equivalent amount of other neutralizing agent.

Theoretically, there are no upper limits to proportions of hydrophobing agent and neutralizing agent so long as the amount of neutralizing agent is sufficient to carry out its function of effectively neutralizing the hydrophobing action so that the gum can swell. As a practical matter of course, the utility of the composition for industrial purposes is predicated upon the content of mannogalactan gum. Consequently, it is generally desirable that the combined amount of hydrophobing agent and neutralizing agent be no more than about equal in weight to the amount of gum in the composition. It is generally preferred that the combined weight of hydrophobing agent and neutralizing agent be of the order of about 20% or less, based on the gum content.

The ratio of amounts of hydrophobing agent to neutralizing agent is determined by their relative effectiveness in carrying out their respective functions rather than simply by weight. Thus, for example, it is readily apparent that for a given amount of a given hydrophobing agent, a weak neutralizing agent will be required in greater amount than a strong neutralizing agent. By way of illustration, the weight proportion of borax to monosodium phosphate is desirably between about 1:3 and 3:1.

The amount of pretreating material in relation to the amount of agent treated depends upon the degree of solubility of the pretreating material in water and upon the particle sizes of the combined pretreated and pretreating materials. If the pretreating material is one that dissolves rapidly in water, the concentration of the pretreated material therein should be relatively low and the particle size as large as is consistent with the avoidance of settling problems in the final composition. If on the other hand the pretreating material is slowly soluble, the concentration of pretreated material therein may be correspondingly higher and the particle size can be correspondingly smaller. By way of illustration, a concentration of 5 parts by weight monosodium phosphate in one part by weight polyethylene glycol having an average molecular weight of about 6000, and is therefore relatively slowly soluble, is eminently satisfactory where the particle size averages between about 0.4 and about 1.0 mm.

It is to be understood that if it is desirable to also delay the dissolution in water of a portion of the hydrophobing agent, particularly of a borate, in order to adjust the viscosity of the gum solution after the gum has been given an opportunity to disperse and then swell, the concentration by weight of the agent in the pretreating material will be correspondingly lower and the particle size will be correspondingly greater. Thus, for example, if borax is pretreated with polyethylene glycol having an average molecular weight of about 6000, the relative proportion by weight, of the borax to the polyethylene glycol may be considerably lower than 5:1, e. g., 1:1 or less.

Furthermore, it is within the scope of the invention to pretreat only part of the total amount of neutralizing agent and to employ a combination of two or more such agents. Thus, for example, an amount of glyoxal that is insufficient to inhibit appreciably the dispersing action of the hydrophobing agent may be employed in non-pretreated form, and the balance of the neutralizing agent may be monosodium phosphate coated with polyethylene glycol. It is also within the scope of the invention to incorporate other materials such as starch, dextrin, preservatives, anti-foaming agents, and the like.

To foam an aqueous lump-free, colloidal solution of mannogalactan gum, the composition of the invention need simply be dumped into water. The water into which the composition is dumped may be cold, i. e., at tap or room temperature, if the gum in the composition is guar or tara gum. If the gum is locust bean gum, then the water should be fairly hot, i. e., at a temperature above about 165° F. in order to enable the gum to open and swell. Upon dumping the composition into water, the hydrophobing agent, by itself or in conjunction with other alkaline materials if the hydrophobing agent is present in minimum amounts, acts immediately to counteract the hydrophilic property of the gum so that it will not absorb large amounts of water and swell. The combined neutralizing agent and pretreating material in the composition dissolve relatively slowly and the neutralizing agent does not attain its full effectiveness in inhibiting or neutralizing the hydrophobing action of the other agent until the gum has been substantially completely dispersed. Upon neutralization of the action of the hydophobing agent, the gum regains its hydrophilic properties and thereupon absorbs water and swells to form a colloidal gum solution. If some borate or other viscosity influencing agent is present in the composition in pretreated form, the dissolution of this additional borate or viscosity influencing agent after the swelling of the gum will operate to adjust the viscosity of the solution to a predetermined value.

One of the most outstanding advantages of the composition of the invention is the ability to obtain a lump-free, colloidal solution of very hydrophilic materials in water by a single operation, whereas heretofore it had been considered necessary to first adjust the pH of the water, then pour the hydrophilic material into the water slowly and carefully while stirring vigorously, and then to treat the resulting dispersion in such a manner as to open or swell the hydrophilic material. The composition, therefore, eliminates the necessity for expensive pumping equipment, stirring mechanisms and heating tanks and its use involves a very considerable saving of labor. Furthermore, it does not require skill to form a lump-free, colloidal solution of mannogalactan gum.

The advantages of the improvement in the paper making method of this invention are manifest. A paper mill not possessing adequate stirring equipment, tank capacity and heating facilities may obtain substantially all the advantages possessed by a mill having such equipment by the simple expedient of dumping the composition of the invention into a container of water, allowing it to stand for a given length of time in order to give the gum an opportunity successively to become completely dispersed, and then opened or swollen, followed, if desired, by a subsequent adjustment of its viscosity. The gum solution thus obtained can readily be added to the furnish at any point prior to the formation of the web, e. g., the deposit of the furnish on the wire of the Fourdrinier machine, the amount added ranging, on a dry basis, from an appreciable amount up to about 30 lbs. per ton of fibrous material in the furnish.

The following example is included to illustrate the best mode contemplated at present of carrying out the invention, it being understood, however, that this example is not to be regarded as limitative in scope.

EXAMPLE

Two compositions essentially comprising guar seed gum powder, borax and a fusion product of monosodium phosphate and polyethylene glycol were prepared. One formulation (A) contained 84.4 parts by weight medium high grade guar gum, 2 parts by weight borax, 10 parts by weight disodium phosphate, and 3.6 parts by weight polyethylene glycol-coated monosodium phosphate. The other formulation (B) contained 85 parts by weight of a medium grade guar gum, 7 parts by weight borax, and 8 parts by weight of the same coated phosphate. The coated phosphate was prepared by heating 5 parts by weight monosodium phosphate with one part by weight of polyethylene glycol having a molecular weight of between about 6000 and 7500 and available on the market under the trade name "Carbowax 6000," to a temperature just below the melting point (60 to 63° C.) of the glycol and then extruding the mixture through a screen. The particles of pretreated monosodium phosphate used in formulations A and B ranged in size from about 0.4 to about 1.0 mm. The compositions so prepared were each dumped into sufficient water at room temperature to yield 4% gum solutions. Very slight stirring-rod agitation was used, the change of pH with time was measured and the ease of dispersion noted by visual inspection. The results are tabulated in Table 1.

Table 1

|  | Formulation | |
|---|---|---|
|  | A | B |
| pH: |  |  |
| Initial | 6.90 | 7.49 |
| in 30 seconds |  | 8.32 |
| in one minute | 8.03 |  |
| in two minutes | 7.65 | 7.19 |
| Dispersibility | Excellent | Excellent |

About one-half hour after the compositions were added to the water, the guar gum had opened completely and the resulting colloidal solutions were stable and lump-free, as determined both visually and by passage thereof through 20 mesh screens.

On a commercial scale, formulation A was added to the furnish in the beaters, at a rate of 9 lbs. per ton of furnish, both on a dry weight basis, of a paper mill producing offset paper at a machine speed of 500 ft./mm.

The Mullen strength of the paper increased noticeably despite the fact that tubsizing of the sheets tended to mask this as well as other beneficial effects.

It is to be understood that innumerable modifications will readily occur to those skilled in the art upon reading this description. All such modifications are intended to be included within the scope of the present invention as defined in the appended claims.

I claim:

1. A dry composition which is readily dispersible in water without lumping consisting essentially of a mannogalactan gum, at least about 0.5% by weight of the gum of a sodium borate, and at least about 0.5% by weight of the gum of a water-soluble acid salt selected from the group consisting of monosodium phosphate, aluminum sulfate, and ammonium chloride; said salt being coated with a polyethylene glycol having an average molecular weight of at least about 2,000 and the combined amount of borate and acid salt being no greater than about equal to the amount of gum in the composition.

2. A dry composition which is readily dispersible in water without lumping consisting generally of a mannogalactan gum, at least about 0.5% by weight of the gum of a sodium borate, and at least about 0.5% by weight of the gum of a water-soluble acid salt selected from the group consisting of monosodium phosphate, aluminum sulfate, and ammonium chloride; said salt being coated with a polyethylene glycol having an average molecular weight of at least about 2,000 and the combined amount of borate and acid salt being no greater than about 20% by weight of the gum in the composition.

3. A dry composition which is readily dispersible in water without lumping consisting essentially of a mannogalactan gum, at least about 0.5% by weight of the gum of a sodium borate, and at least about 0.5% by weight of the gum of a water-soluble acid salt selected from the group consisting of monosodium phosphate, aluminum sulfate, and ammonium chloride; said salt being coated with a polyethylene glycol having an average molecular weight ranging between about 6,000 and about 7,500, said polyethylene glycol-coated acid salt being in the form of particles having an average size between about 0.17 and about 3.5 millimeters, and the combined amount of borate and acid salt being no greater than about 20% by weight of the gum in the composition.

4. A dry composition which is readily dispersible in water without lumping consisting essentially of about 85% guar gum, about 2% borax, about 10% disodium phosphate, and about 3% monosodium phosphate, the monosodium phosphate being coated with polyethylene glycol having an average molecular weight ranging between about 6,000 and about 7,500 in the form of discrete particles having an average size between about 0.4 and about 1.0 millimeter.

5. A dry composition which is readily dispersible in water without lumping consisting essentially of about 85% guar gum, about 7% borax, and about 8% monosodium phosphate, the monosodium phosphate being coated with polyethylene glycol having an average molecular weight ranging between about 6,000 and about 7,500 in the form of discrete particles having an average size between about 0.4 and about 1.0 millimeter.

References Cited in the file of this patent

UNITED STATES PATENTS

| | | |
|---|---|---|
| 1,986,243 | Arveson | Jan. 1, 1935 |
| 2,144,522 | Braum | Jan. 17, 1939 |
| 2,379,646 | Mueller | July 3, 1945 |
| 2,407,635 | Engler | Sept. 17, 1946 |
| 2,439,460 | Engler | Sept. 13, 1948 |
| 2,522,306 | Serrallach | Sept. 12, 1950 |
| 2,523,708 | Moe | Sept. 26, 1950 |
| 2,532,489 | Ferguson | Dec. 5, 1950 |
| 2,644,749 | Frisch et al. | July 7, 1953 |
| 2,644,750 | Frisch et al. | July 7, 1953 |
| 2,644,751 | Frisch et al. | July 7, 1953 |
| 2,644,752 | Frisch et al. | July 7, 1953 |
| 2,644,762 | Frisch | July 7, 1953 |

OTHER REFERENCES

Rowland: Paper Ind. and Paper World, December 1945, pp. 1398, 1400, 1402, 1404.

Tappi: February 1950, pp. 77–81.

UNITED STATES PATENT OFFICE
CERTIFICATE OF CORRECTION

Patent No. 2,868,664                          January 13, 1959

Arthur M. Goldstein

It is hereby certified that error appears in the printed specification of the above numbered patent requiring correction and that the said Letters Patent should read as corrected below.

Column 3, line 43, for "size" read -- sizes --; column 7, line 4, for "generally" read -- essentially --.

Signed and sealed this 12th day of May 1959.

(SEAL)
Attest:
KARL H. AXLINE
Attesting Officer

ROBERT C. WATSON
Commissioner of Patents